United States Patent
Pannell et al.

(10) Patent No.: US 7,876,746 B1
(45) Date of Patent: Jan. 25, 2011

(54) REMOTE MANAGEMENT FOR NETWORK SWITCHES

(75) Inventors: Donald Pannell, Cupertino, CA (US); Hong Yu Chou, Saratoga, CA (US)

(73) Assignee: Marvell International Ltd., Hamilton (BM)

( * ) Notice: Subject to any disclaimer, the term of this patent is extended or adjusted under 35 U.S.C. 154(b) by 442 days.

(21) Appl. No.: 11/810,667

(22) Filed: Jun. 6, 2007

Related U.S. Application Data (60) Provisional application No. 60/815,538, filed on Jun. 21, 2006.

(51) Int. Cl.
H04L 12/66 (2006.01)
H04L 12/50 (2006.01)
H04Q 11/00 (2006.01)

(52) U.S. Cl. .................. 370/373; 370/377; 370/384

(58) Field of Classification Search ............... None
See application file for complete search history.

(56) References Cited

U.S. PATENT DOCUMENTS

| | | | |
|---|---|---|---|
| 5,826,093 A | 10/1998 | Assouad et al. | |
| 6,636,483 B1 | 10/2003 | Pannell et al. | |
| 6,738,821 B1 * | 5/2004 | Wilson et al. | 709/230 |
| 7,031,341 B2 * | 4/2006 | Yu | 370/469 |
| 7,206,860 B2 * | 4/2007 | Murakami et al. | 709/238 |
| 7,370,135 B2 * | 5/2008 | Delano et al. | 710/316 |
| 7,373,472 B2 * | 5/2008 | Bhasin et al. | 711/170 |
| 7,440,469 B2 * | 10/2008 | Oner | 370/419 |
| 7,548,512 B2 | 6/2009 | Sexton et al. | |
| 2004/0258081 A1 | 12/2004 | Hayashi | |

(Continued)

OTHER PUBLICATIONS

IEEE Std 802.3-2002 (Revision of IEEE Std 802.3®, 2000 Edition) IEEE Standard for Information technology—Telecommunications and information exchange between systems—Local and metropolitan area networks—Specific requirements—Part 3: Carrier sense multiple access with collision detection (CSMA/CD) access method and physical layer specifications; LAN/MAN Standards Committee of the IEEE Computer Society; Mar. 8, 2002; 578 pages.

(Continued)

*Primary Examiner*—Chi H Pham
*Assistant Examiner*—Soon-Dong D Hyun (57) ABSTRACT

An apparatus includes at least one input circuit to receive frames of data, the frames of data comprising first frames each having first data, and a second frame having second data. The apparatus includes at least one output circuit to transmit the first frames; a forwarding engine to transfer the first frames from the at least one input circuit to the at least one output circuit; and a first memory to store switch information. The apparatus operates according to the switch information. The at least one input circuit includes a remote management unit comprising a first memory controller to modify the switch information stored in the first memory according to the second data in the second frame, and a second memory; a second memory controller to write each of the frames of data to the second memory; and a remote management enable circuit to enable the remote management unit when the second frame is a remote management frame. The first memory controller writes the second data from the second memory to the first memory when the remote management unit is enabled by the remote management enable circuit and the remote management frame includes a valid write command.

24 Claims, 7 Drawing Sheets

U.S. PATENT DOCUMENTS

| | | | |
|---|---|---|---|
| 2005/0216584 A1* | 9/2005 | Chisholm | 709/224 |
| 2006/0186973 A1 | 8/2006 | Satou | |
| 2007/0127469 A1* | 6/2007 | Rashid et al. | 370/389 |
| 2008/0095083 A1* | 4/2008 | Sorenson et al. | 370/295 |
| 2008/0114887 A1* | 5/2008 | Bryers et al. | 709/230 |

OTHER PUBLICATIONS

IEEE Std 802.3-2002 (Revision of IEEE Std 802.3®, 2000 Edition) IEEE Standard for Information technology—Telecommunications and information exchange between systems—Local and metropolitan area networks—Specific requirements—Part 3: Carrier sense multiple access with Collision Detection (CSMA/CD) access method and physical layer specifications; Section Two: This section includes Clauses 21 through 22 and Annexes 22A through 32A; LAN/MAN Standards Committee of the IEEE Computer Society; Mar. 8, 2002; 582 pages.

IEEE Std 802.3-2002 (Revision of IEEE Std 802.3®, 2000 Edition) IEEE Standard for Information technology—Telecommunications and information exchange between systems—Local and metropolitan area networks—Specific requirements—Part 3: Carrier sense multiple access with collision detection (CSMA/CD) access method and physical layer specifications; Section Three: This section includes Clauses 34 through 43 and Annexes 36A through 43C; LAN/MAN Standards Committee of the IEEE Computer Society; Mar. 8, 2002; 379 pages.

* cited by examiner

REMOTE MANAGEMENT FOR NETWORK SWITCHES

CROSS-REFERENCE TO RELATED APPLICATIONS

This application claims the benefit of U.S. Provisional Patent Application Ser. No. 60/815,538 filed Jun. 21, 2006, the disclosure thereof incorporated by reference herein in its entirety.

BACKGROUND

The present invention relates generally to data communications. More particularly, the present invention relates to remote management for network switches.

It is often desirable to manage a network switch remotely, that is, from a location other than the location of the network switch, generally by reading and writing memories, such as configuration registers and memories storing address and management information databases, in the network switch.

Conventional techniques for remote management of network switches include implementing a unit that includes a central processing unit (CPU) connected to the network switch. Management frames are sent to the CPU, which manages the network switch. One disadvantage of this approach is the cost of the CPU, especially when the location of the network switch, for example outside a customer's home, requires the CPU and any associated components to be implemented according to industrial temperature standards.

Once the CPU receives management frames, the CPU reads and writes registers and memory inside the attached network switch device using a local interface. One conventional technique for this 'CPU to register' access is a high speed bus interface like PCI (Peripheral Component Interconnect). One disadvantage of this approach is the cost of the device pins associated with such buses.

One conventional technique to save pins for the local interface of network switches employs an existing serial interface such as the System Management Interface (SMI) to manage the network switch. SMI requires only two pins that can be shared between many devices, but has comparatively slow performance. However, as the performance and complexity of current network switches has grown, so have the switch databases, which are now so large that the SMI interface is now considered too slow to transfer such large amounts of data. For example, to read an 8 k entry address database over an SMI interface may require approximately 25 seconds depending upon the design. Furthermore, customers are reading management information frequently, for example to determine utilization rates.

SUMMARY

In general, in one aspect, the invention features an apparatus comprising: at least one input circuit to receive frames of data, the frames of data comprising first frames each having first data and a second frame having second data; at least one output circuit to transmit the first frames; a forwarding engine to transfer the first frames from the at least one input circuit to the at least one output circuit; and a first memory to store switch information, wherein the apparatus operates according to the switch information; wherein the at least one input circuit comprises a remote management unit comprising a first memory controller to modify the switch information stored in the first memory according to the second data in the second frame.

In some embodiments, the remote management unit further comprises a second memory; wherein the second frame comprises a write command; wherein the at least one input circuit further comprises a second memory controller to write each of the frames of data to the second memory, and a remote management enable circuit to enable the remote management unit according to the write command; and wherein the first memory controller writes the second data from the second memory to the first memory when enabled by the remote management enable circuit and when the write command is present in the second memory. In some embodiments, the second data describes associations between addresses of the first frames and the at least one output circuit; and wherein the forwarding engine transfers the first frames from the at least one input circuit to the at least one output circuit according to the associations. In some embodiments, the first memory controller reads third data from the first memory in response to the second frame; wherein the remote management unit further comprises a frame circuit to generate a third frame having the third data; and wherein the at least one output circuit transmits the third frame. In some embodiments, the remote management unit further comprises a second memory; wherein the second frame comprises a read command; wherein the at least one input circuit further comprises a second memory controller to write each of the frames of data to the second memory, and a remote management enable circuit to enable the remote management unit according to the read command; and wherein the first memory controller reads the third data from the first memory when enabled by the remote management enable circuit and when the read command is present in the second memory. In some embodiments, the third data comprises associations between addresses of the first frames and the at least one output circuit; and wherein the forwarding engine transfers the first frames from the at least one input circuit to the at least one output circuit according to the associations. In some embodiments, the third data comprises management information describing operation of the apparatus. Some embodiments comprise an integrated circuit comprising the apparatus. Some embodiments comprise a switch comprising the integrated circuit.

In general, in one aspect, the invention features a method comprising: receiving frames of data into at least one input circuit of an apparatus, the frames of data comprising first frames each having first data and a second frame having second data; transmitting the first frames from at least one output circuit; transferring the first frames from the at least one input circuit to the at least one output circuit; and storing switch information, wherein the apparatus operates according to the switch information; and modifying the stored switch information according to the second data the second frame.

In some embodiments, the second data describes associations between addresses of the first frames and the at least one output circuit. Some embodiments comprise reading third data from the stored switch information in response to the second frame; generating a third frame having the third data; and transmitting the third frame from the at least one output circuit. In some embodiments, the third data comprises associations between addresses of the first frames and the at least one output circuit. In some embodiments, the third data comprises management information describing operation of the apparatus.

In general, in one aspect, the invention features an apparatus comprising: at least one input circuit to receive frames of data, the frames of data comprising first frames each having first data and a second frame having second data; at least one output circuit to transmit the first frames; a forwarding engine to transfer the first frames from the at least one input circuit to the at least one output circuit; and a first memory to store third data comprising at least one of switch information, wherein the apparatus operates according to the switch information, and management information describing operation of the apparatus; and wherein the at least one input circuit comprises a remote management unit comprising a first memory controller to read the third data from the first memory in response to the second frame, and a frame circuit to generate a third frame having the third data, wherein the at least one output circuit transmits the third frame.

In some embodiments, the remote management unit further comprises a second memory; wherein the second frame comprises a read command; wherein the at least one input circuit further comprises a second memory controller to write each of the frames of data to the second memory, and a remote management enable circuit to enable the remote management unit according to the read command; and wherein the first memory controller reads the third data from the first memory when enabled by the remote management enable circuit and when the read command is present in the second memory. In some embodiments, the third data comprises associations between addresses of the first frames and the at least one output circuit; and wherein the forwarding engine transfers the first frames from the at least one input circuit to the at least one output circuit according to the associations. In some embodiments, the first memory controller modifies the third data stored in the first memory according to the second data in the second frame. In some embodiments, the remote management unit further comprises a second memory; wherein the second frame comprises a write command; wherein the at least one input circuit further comprises a second memory controller to write each of the frames of data to the second memory, and a remote management enable circuit to enable the remote management unit according to the write command; wherein the first memory controller writes the second data from the second memory to the first memory when enabled by the remote management enable circuit and when the write command is present in the second memory. In some embodiments, the second data describes associations between addresses of the first frames and the at least one output circuit; and wherein the forwarding engine transfers the first frames from the at least one input circuit to the at least one output circuit according to the associations. Some embodiments comprise an integrated circuit comprising the apparatus. Some embodiments comprise a switch comprising the integrated circuit.

In general, in one aspect, the invention features a method comprising: receive frames of data into at least one input circuit of an apparatus, the frames of data comprising first frames each having first data and a second frame having second data; transmitting the first frames from at least one output circuit; transferring the first frames from the at least one input circuit to the at least one output circuit; storing third data in a memory, the third data comprising at least one of switch information, wherein the apparatus operates according to the switch information, and management information describing operation of the apparatus; reading the third data from the memory in response to the second frame; generating a third frame having the third data; and transmitting the third frame from the at least one output circuit. In some embodiments, the third data comprises associations between addresses of the first frames and the at least one output circuit. Some embodiments comprise modifying the third data according to the second data in the second frame. In some embodiments, the second data describes associations between addresses of the first frames and the at least one output circuit.

In general, in one aspect, the invention features a frame comprising: a preamble; a start frame delimiter; a destination media access control (MAC) address; a source MAC address; a tag comprising a remote management flag; a length/type; MAC client data comprising remote management data when the remote management flag is set, wherein the remote management data comprises one or more of a plurality of commands to be executed by a network switch having the destination MAC address; and a frame check sequence.

In some embodiments, the tag further comprises: a sequence number. In some embodiments, the remote management data further comprises: a request format identifying a device type for the network switch. In some embodiments, the frame is compliant with IEEE standard 802.3.

In general, in one aspect, the invention features a frame comprising: a preamble; a start frame delimiter; a destination media access control (MAC) address; a source MAC address; a tag comprising a remote management flag; a length/type; MAC client data comprising remote management data when the remote management flag is set, wherein the remote management data comprises a response to a command from a management device having the destination MAC address; and a frame check sequence.

In some embodiments, the tag further comprises: a sequence number. In some embodiments, the remote management data further comprises: a response format identifying a device type for the network switch. In some embodiments, the frame is compliant with IEEE standard 802.3.

In general, in one aspect, the invention features an apparatus comprising: at least one input means for receiving frames of data, the frames of data comprising first frames each having first data and a second frame having second data; at least one output means for transmitting the first frames; forwarding means for transferring the first frames from the at least one input means to the at least one output means; and first memory means for storing switch information, wherein the apparatus operates according to the switch information; wherein the at least one input means comprises remote management means comprising first memory controller means for modifying the switch information stored in the first memory means according to the second data in the second frame.

In some embodiments, the remote management means further comprises second memory means for storing data; wherein the second frame comprises a write command; wherein the at least one input means further comprises second memory controller means for writing each of the frames of data to the second memory means, and remote management enable means for enabling the remote management means according to the write command; and wherein the first memory controller means writes the second data from the second memory means to the first memory means when enabled by the remote management enable means and when the write command is present in the second memory means. In some embodiments, the second data describes associations between addresses of the first frames and the at least one output means; and wherein the forwarding means transfers the first frames from the at least one input means to the at least one output circuit means according to the associations. In some embodiments, the first memory controller means reads third data from the first memory means in response to the second frame; wherein the remote management means further comprises a frame means for generating a third frame having the third data; and wherein the at least one output means transmits the third frame. In some embodiments, the remote management means further comprises second memory means for storing data; wherein the second frame comprises a read command; wherein the at least one input means further comprises second memory controller means for writing each of the frames of data to the second memory means, and remote management enable means for enabling the remote management means according to the read command; and wherein the first memory controller means reads the third data from the first memory means when enabled by the remote management enable means and when the read command is present in the second memory means. In some embodiments, the third data comprises associations between addresses of the first frames and the at least one output means; and wherein the forwarding means transfers the first frames from the at least one input means to the at least one output means according to the associations. In some embodiments, the third data comprises management information describing operation of the apparatus. Some embodiments comprise an integrated circuit comprising the apparatus. Some embodiments comprise a switch comprising the integrated circuit.

In general, in one aspect, the invention features a computer program executable on a processor of an apparatus having at least one input circuit to receive frames of data, the frames of data comprising first frames each having first data and a second frame having second data, and at least one output circuit to transmitting the first frames, the computer program comprising: instructions for transferring the first frames from the at least one input circuit to the at least one output circuit; instructions for storing switch information, wherein the apparatus operates according to the switch information; and instructions for modifying the stored switch information according to the second data in the second frame.

In some embodiments, the second data describes associations between addresses of the first frames and the at least one output circuit. Some embodiments comprise instructions for reading third data from the stored switch information in response to the second frame; instructions for generating a third frame having the third data; and instructions for causing transmission of the third frame from the at least one output circuit. In some embodiments, the third data comprises associations between addresses of the first frames and the at least one output circuit. In some embodiments, the third data comprises management information describing operation of the apparatus.

In general, in one aspect, the invention features an apparatus comprising: at least one input means for receiving frames of data, the frames of data comprising first frames each having first data and a second frame having second data; at least one output means for transmitting the first frames; forwarding means for transferring the first frames from the at least one input means to the at least one output means; and first memory means for storing third data comprising at least one of switch information, wherein the apparatus operates according to the switch information, and management information describing operation of the apparatus; and wherein the at least one input means comprises remote management means comprising first memory controller means for read the third data from the first memory means in response to the second frame, and frame means for generating a third frame having the third data, wherein the at least one output means transmits the third frame.

In some embodiments, the remote management means further comprises second memory means for storing data; wherein the second frame comprises a read command; wherein the at least one input means further comprises second memory controller means for writing each of the frames of data to the second memory means, and remote management enable means for enabling the remote management means according to the read command; and wherein the first memory controller means reads the third data from the first memory means when enabled by the remote management enable means and when the read command is present in the second memory means. In some embodiments, the third data comprises associations between addresses of the first frames and the at least one output means; and wherein the forwarding means transfers the first frames from the at least one input means to the at least one output means according to the associations. In some embodiments, the first memory controller means modifies the third data stored in the first memory means according to the second data in the second frame. In some embodiments, the remote management means further comprises second memory means for storing data; wherein the second frame comprises a write command; wherein the at least one input means further comprises second memory controller means for writing each of the frames of data to the second memory means, and remote management enable means for enabling the remote management means according to the write command; wherein the first memory controller means writes the second data from the second memory means to the first memory means when enabled by the remote management enable means and when the write command is present in the second memory means. In some embodiments, the second data describes associations between addresses of the first frames and the at least one output means; and wherein the forwarding means transfers the first frames from the at least one input means to the at least one output means according to the associations. Some embodiments comprise an integrated circuit comprising the apparatus. Some embodiments comprise a switch comprising the integrated circuit.

In general, in one aspect, the invention features a computer program executable on a processor of an apparatus having at least one input circuit to receive frames of data, the frames of data comprising first frames each having first data and a second frame having second data, and at least one output circuit to transmitting the first frames, the computer program comprising: instructions for transferring the first frames from the at least one input circuit to the at least one output circuit; instructions for storing third data in a memory, the third data comprising at least one of switch information, wherein the apparatus operates according to the switch information, and management information describing operation of the apparatus; instructions for reading the third data from the memory in response to the second frame; instructions for generating a third frame having the third data; and instructions for causing transmission of the third frame from the at least one output circuit.

In some embodiments, the third data comprises associations between addresses of the first frames and the at least one output circuit. Some embodiments comprise instructions for modifying the third data according to the second data in the second frame. In some embodiments, the second data describes associations between addresses of the first frames and the at least one output circuit.

The details of one or more implementations are set forth in the accompanying drawings and the description below. Other features will be apparent from the description and drawings, and from the claims.

DESCRIPTION OF DRAWINGS

The leading digit(s) of each reference numeral used in this specification indicates the number of the drawing in which the reference numeral first appears.

DETAILED DESCRIPTION

Embodiments of the present invention provide remote management for network switches, thereby enabling an administrator at one location to manage a network switch at another location over a network or to manage a local network switch device. In some embodiments, frames such as Ethernet frames are used to access memories within the switch, for example to perform such management functions as altering the switch configuration, reading the management information base (MIB), and reading and writing the address database, without the need of a central processing unit (CPU). In other embodiments, the local CPU inside a network switch can manage the local devices with higher performance while at the same time saving device pins. Embodiments of the present invention thus provide a solution to the local interface performance vs. pin cost problem by utilizing the existing frame interface between the CPU and the switch device. This approach can be used to eliminate the CPU and any associated components from a physically remote network switch, for example outside a customer's home.

Figure 1:
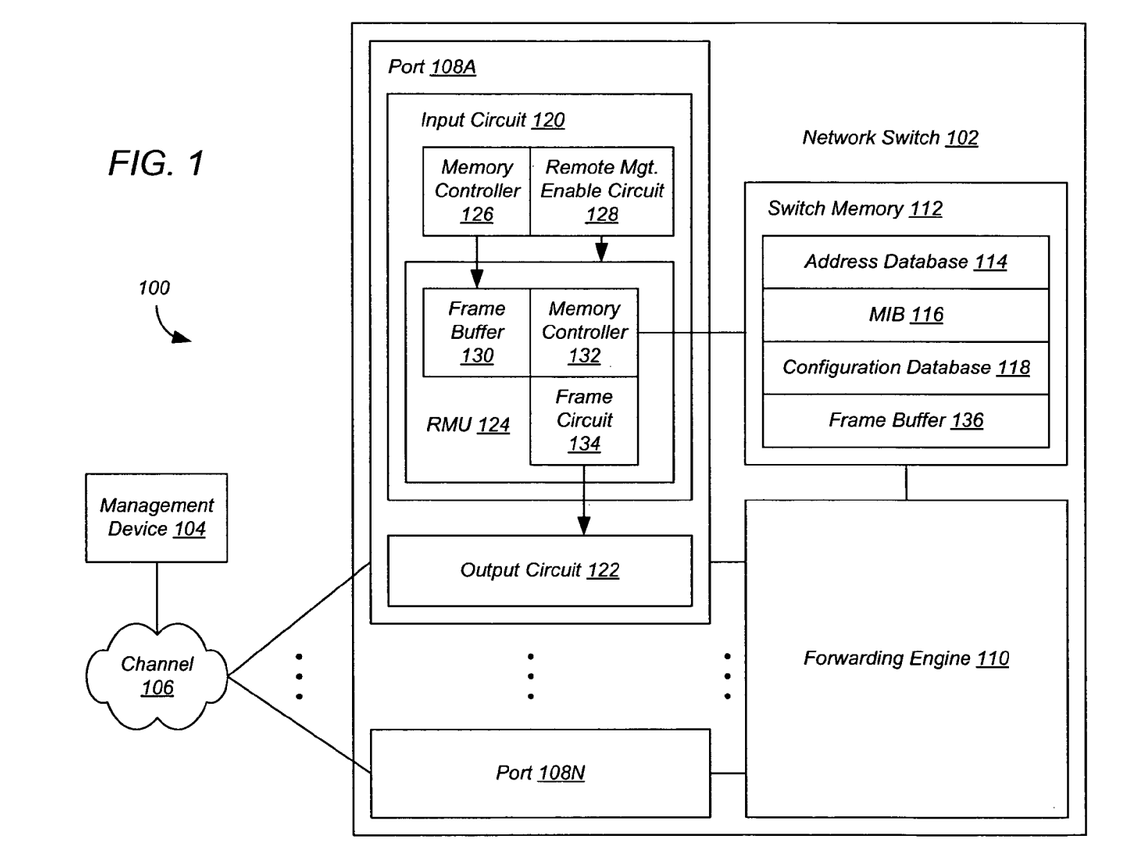
FIG. 1 shows a remote management system for a network switch according to a preferred embodiment of the present invention.

FIG. 1 shows a remote management system 100 for a network switch 102 according to a preferred embodiment of the present invention. Remote management system 100 comprises network switch 102 in communication with a management device 104 over a channel 106. Network switch 102 can be implemented as one or more integrated circuits. Management device 104 can be implemented as a personal computer, workstation, CPU, or the like.

In some embodiments, channel 106 is implemented as a layer-2 network, for example in a remote management configuration where management device 104 is remote from network switch 102. In other embodiments, channel 106 can be implemented as a direct link, for example in a configuration where management device 104 is implemented as a CPU connected directly to network switch 102.

Network switch 102 comprises a plurality of ports 108A-N in communication with a forwarding engine 110. Network switch 102 also comprises a switch memory 112 to store an address database 114, a management information base (MIB) 116, a configuration database 118, and a frame buffer 136. Switch memory 112 can be implemented as one or more memories, which can be of different types such as random-access memory, registers, and the like. For example, switch memory 112 can include registers deployed in input circuits 120, output circuits 122, forwarding engine 110, other local and global registers, and the like.

Each port 108A-N comprises a respective input circuit 120 and a respective output circuit 122. Each port 108 can be implemented as a remote management port according to preferred embodiments of the present invention. However, for clarity of explanation, only one port 108A of network switch 102 is implemented as a remote management port.

In some embodiments, only one or more designated ports 108 are implemented as remote management ports. For example, in a network access box deployed at a customer's home, the customer port is not implemented as a remote management port to prevent the customer from controlling the network access switch.

Input circuit 120 of remote management port 108A comprises a remote management unit (RMU) 124, a memory controller 126, and a remote management enable circuit 128. Remote management unit 124 comprises a remote management frame buffer 130, a memory controller 132, and a frame circuit 134. Remote management frame buffer 130 is preferably implemented as a 512 kB static random-access memory, although other memory sizes and types can be used. As shown in FIG. 1, remote management frame buffer 130 and frame buffer 136 are preferably implemented separately. This arrangement permits remote management unit 124 to function even if there is a problem with network switch 102.

Figure 2:
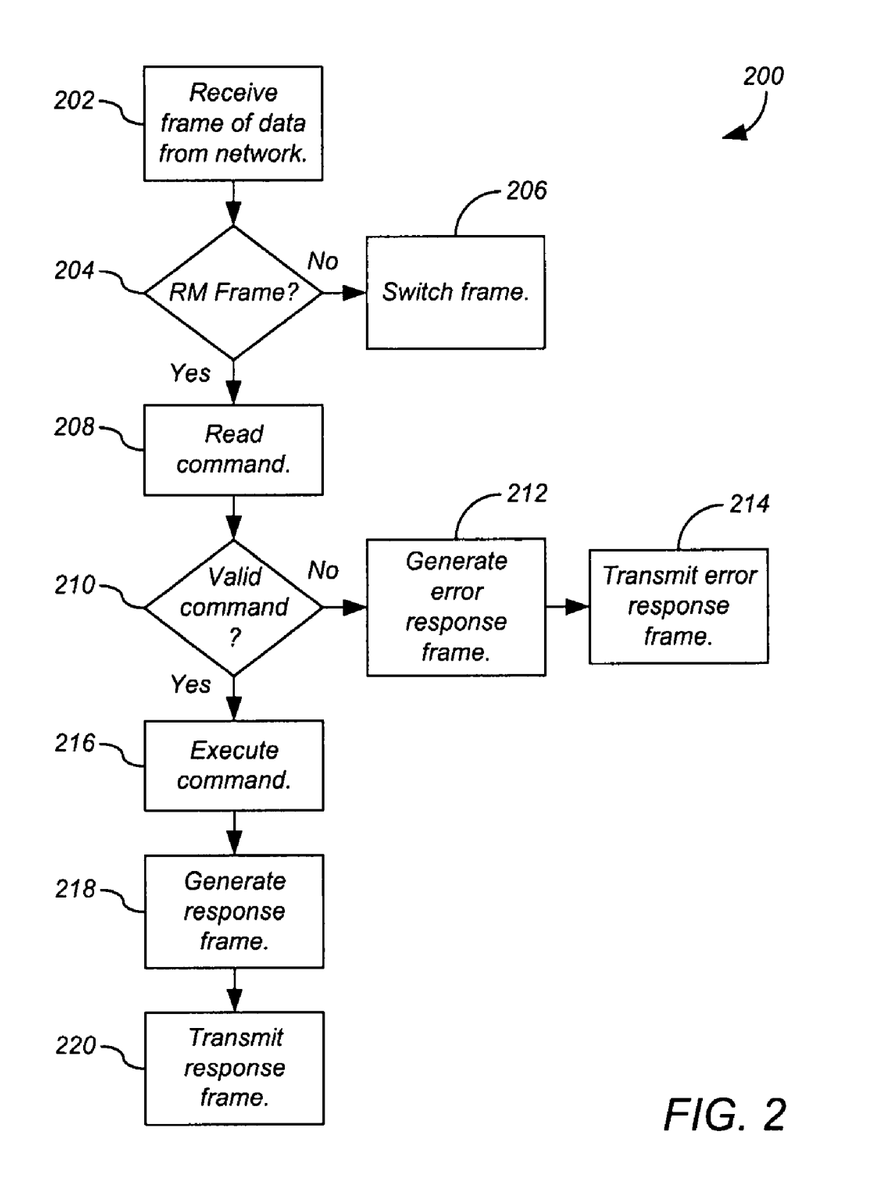
FIG. 2 shows a process for the network switch of FIG. 1 according to a preferred embodiment of the present invention.

FIG. 2 shows a process 200 for network switch 102 of FIG. 1 according to a preferred embodiment of the present invention. Input circuit 120 of remote management port 108A receives a frame of data from channel 106 (step 202). Preferably input circuit 120 of remote management port 108A writes each received frame of data to remote management unit 124. In particular, memory controller 126 of input circuit 120 writes the frame of data to remote management frame buffer 130 of remote management unit 124.

Input circuit 120 then determines whether the frame is a remote management frame (step 204). Preferably each remote management frame comprises a remote management flag or some other unique identifier that, when set, identifies the frame as a remote management frame. Remote management enable circuit 128 tests the remote management flag.

When the frame is not a remote management frame, network switch 102 switches the frame according to conventional techniques (step 206). In particular, forwarding engine 110 passes the frame to one or more of ports 108 selected according to address database 114 stored in switch memory 112. Output circuit(s) 122 of the selected ports(s) 108 then transmit the frame from network switch 102.

When the frame is a remote management frame, remote management unit 124 processes the frame. In particular, remote management enable circuit 128 tests the remote management flag, and when the remote management flag is set, enables remote management unit 124.

Each remote management frame comprises a command, for example, read, write, destructive read (in other words, read and clear), and the like. When enabled, remote management unit 124 reads the command from remote management frame buffer 130 (step 208) and validates the command (step 210). If the command is invalid (for example, the command does not conform to a known command, attempts to access an illegal memory location or register, and the like), frame circuit 134 generates an error response frame addressed to the sender of the invalid remote management frame (step 212).

Network switch 102 then transmits the error response frame (step 214). Preferably each remote management frame comprises a sequence number established by the sender. Remote management unit 124 preferably includes the sequence number in the corresponding response frame to enable the sender to match the response frame with the corresponding remote management frame.

However, if the command in the remote management frame is valid, remote management unit 124 executes the command (step 216). If the command is a write command, memory controller 132 of remote management unit 124 transfers data specified by the remote management frame to the location in switch memory 112 specified by the remote management frame. Write commands can be used, for example, to alter switch information governing the operation of network switch 102 such as address database 114 and configuration database 118.

Preferably remote management unit 124 generates a response frame for each remote management frame in order to provide feedback to the sender. In these embodiments, frame circuit 134 generates the response frame addressed to the sender of the remote management frame (step 218), which network switch 102 then transmits (step 220). Preferably the response frame includes the sequence number of the remote management frame.

If the command is a read command, memory controller 132 of remote management unit 124 reads data from the location in switch memory 112 specified by the remote management frame. Read commands can be used, for example, to read address database 114, MIB 116, and configuration database 118. The read commands can be destructive, in which case memory controller 132 also clears the specified locations in switch memory 112. Frame circuit 134 generates a response frame addressed to the sender of the remote management frame and comprising the requested data (step 218), which network switch 102 then transmits (step 220). Preferably the response frame includes the sequence number of the remote management frame.

Figure 3:
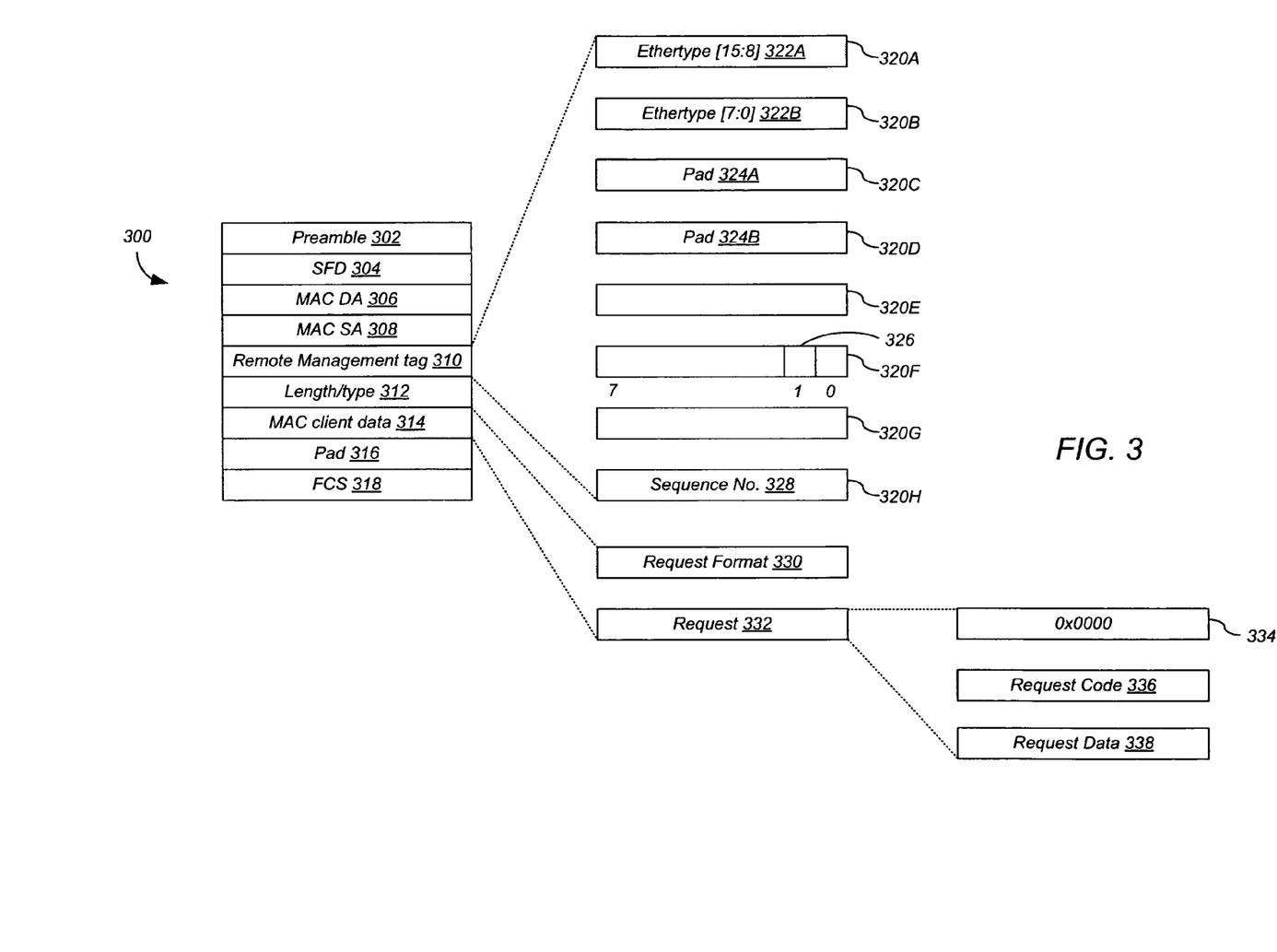
FIG. 3 shows the format of a request frame according to a preferred embodiment of the present invention.

FIG. 3 shows the format of a request frame 300 according to a preferred embodiment of the present invention. For example, request frame 300 can be used as described above to transmit remote management information from management device 104 to network switch 102.

Frame 300 comprises a 7-octet preamble 302, a 1-octet start frame delimiter (SFD) 304, a 6-octet MAC destination address (DA) 306, a 6-octet MAC source address (SA) 308, a 4-octet remote management tag 310, a 2-octet length/type 312, MAC client data 314, a variable-size pad 316, and a frame check sequence (FCS) 318. Of course the fields of frame 300 can have different lengths and occur in different sequences than described, as will be apparent to one skilled in the relevant arts after reading this description.

Remote management tag 310 preferably comprises eight octets 320A-H, although other tag sizes are contemplated. Octets 320A and 320B preferably comprise an Ethertype value. When remote management frame 300 is used in a layer-2 network, the Etherype value can be used to cause layer-2 switches to simply forward the frame 300 instead of attempting to process remote management tag 310, thereby ensuring that frame 300 reaches its destination intact. When management device 104 has a direct link to network switch 102, for example when management device 104 and network switch 102 are implemented within the same box, octets 320A-D are optional because the frame will not be passing through a layer-2 network.

Bit 1 of octet 320F comprises a remote management flag 326 that can be used as described above to indicate that frame 300 is a remote management frame. Of course other bits, or combinations of bits, in octets 320A-G can be used to indicate frame 300 is a remote management frame, as will be apparent to one skilled in the relevant arts based on the disclosure and teachings provided herein. Octet 320H comprises a sequence number 328, which can be used as described above to match requests and responses.

MAC client data 314 preferably comprises a 2-octet request format 330 that can be used to identify a device type of the recipient network switch 102, and a variable-length request 332, which comprises two octets 334 set to 0x0000, a 2-octet request code 336 comprising one or more commands, and variable-length request data 338 such as data to be written to switch memory 112.

Figure 4:
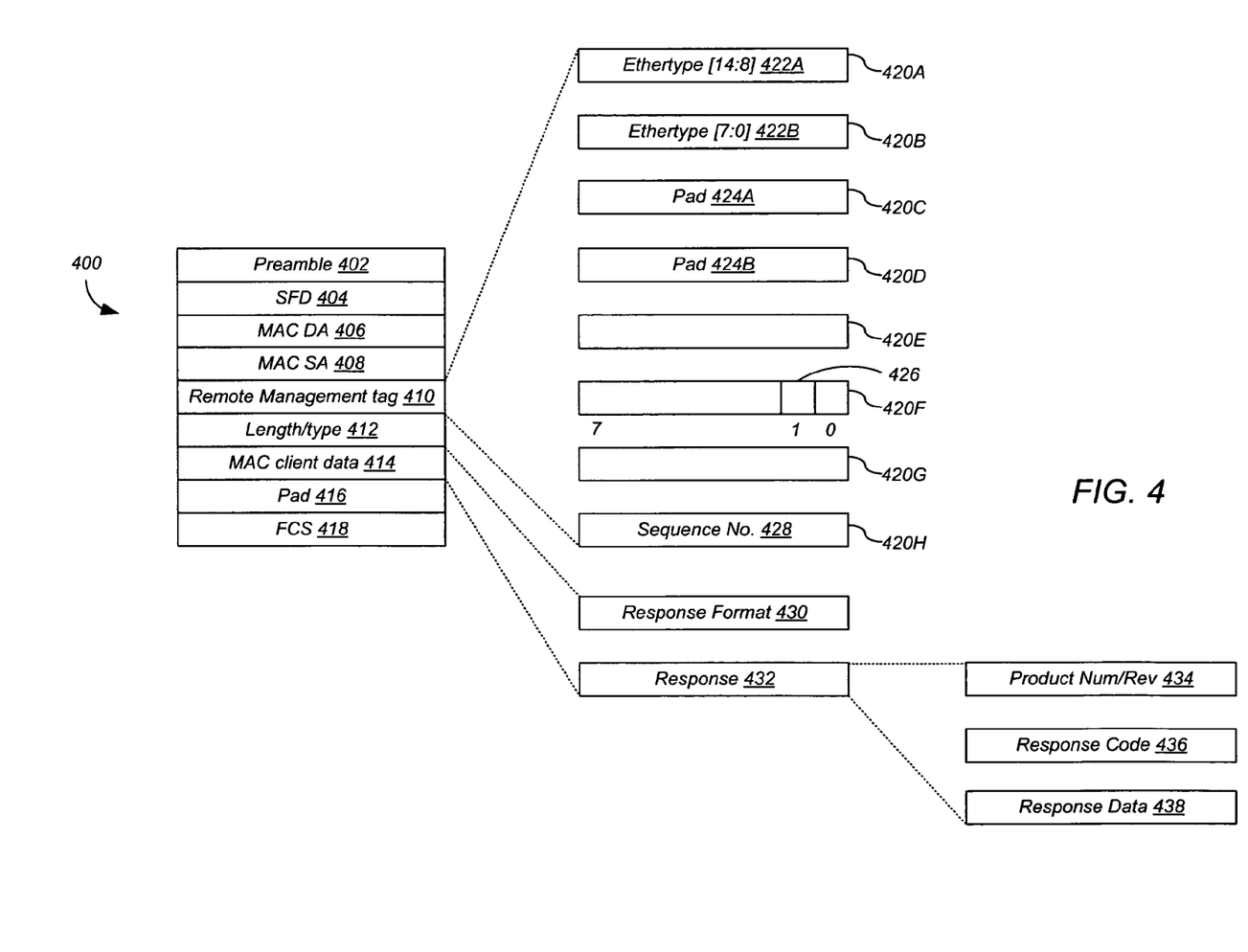
FIG. 4 shows the format of a response frame according to a preferred embodiment of the present invention.

FIG. 4 shows the format of a response frame 400 according to a preferred embodiment of the present invention. For example, response frame 400 can be used as described above to transmit remote management information from network switch 102 to management device 104.

Frame 400 comprises a 7-octet preamble 402, a 1-octet start frame delimiter (SFD) 404, a 6-octet MAC destination address (DA) 406, a 6-octet MAC source address (SA) 408, a 4-octet remote management tag 410, a 2-octet length/type 412, MAC client data 414, a variable-size pad 416, and a frame check sequence (FCS) 418. Of course the fields of frame 400 can have different lengths and occur in different sequences than described, as will be apparent to one skilled in the relevant arts after reading this description.

Remote management tag 410 preferably comprises eight octets 420A-H, although other tag sizes are contemplated. Octets 420A and 420B preferably comprise an Ethertype value. When remote management frame 400 is used in a layer-2 network, the Ethertype value can be used to cause layer-2 switches to simply forward the frame 400 instead of attempting to process remote management tag 410, thereby ensuring that frame 400 reaches its destination intact.

Bit 1 of octet 420F comprises a remote management flag 426 that can be used as described above to indicate that frame 400 is a remote management frame. Octet 420H comprises a sequence number 428, which can be used as described above to match requests and responses.

MAC client data 414 preferably comprises a 2-octet response format 430 that can be used to identify a device type of the sending network switch 102 and a variable-length response 432, which comprises a 2-octet Product Num/Rev 434 indicating the product number and revision of the device transmitting frame 400, a 2-octet response code 436, and variable-length response data 438 such as data read from switch memory 112.

In some embodiments, a single request frame 300 can provoke multiple response frames 400, for example to dump an address translation unit (ATU), and the like. For example, a 512-byte response frame 400 can include 48 ATU entries. With an ATU containing 1 k to 16 k entries, it is clear that many frames are needed to dump the full contents of the ATU. In these embodiments it is preferable to limit the rate and maximum number of response frames 400 as a CPU may not have enough memory or bandwidth to accept the full contents of the ATU at one time.

In some embodiments, remote management unit 124 can generate a response frame 400 without previously receiving a corresponding request frame 300, for example as the direct result of some action that needs to be serviced inside the device, such as servicing an interrupt and the like.

Figure 5A:
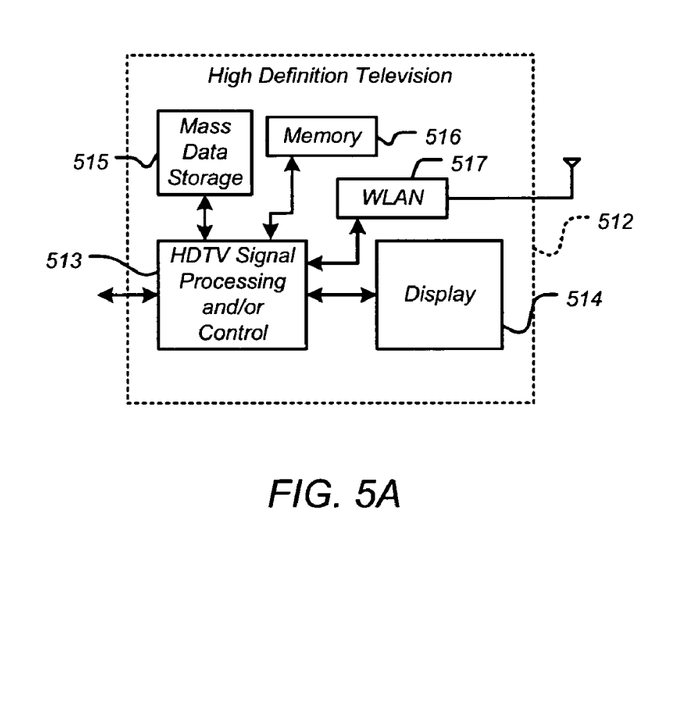
FIGS. 5A-5E show various exemplary implementations of the present invention.

FIGS. 5A-5E show various exemplary implementations of the present invention. Referring now to FIG. 5A, the present invention can be implemented in a high definition television (HDTV) 512. The present invention may implement either or both signal processing and/or control circuits, which are generally identified in FIG. 5A at 513, a WLAN interface and/or mass data storage of the HDTV 512. The HDTV 512 receives HDTV input signals in either a wired or wireless format and generates HDTV output signals for a display 514. In some implementations, signal processing circuit and/or control circuit 513 and/or other circuits (not shown) of the HDTV 512 may process data, perform coding and/or encryption, perform calculations, format data and/or perform any other type of HDTV processing that may be required.

The HDTV 512 may communicate with mass data storage 515 that stores data in a nonvolatile manner such as optical and/or magnetic storage devices. The HDD may be a mini HDD that includes one or more platters having a diameter that is smaller than approximately 1.8". The HDTV 512 may be connected to memory 516 such as RAM, ROM, low latency nonvolatile memory such as flash memory and/or other suitable electronic data storage. The HDTV 512 also may support connections with a WLAN via a WLAN network interface 517.

Figure 5B:
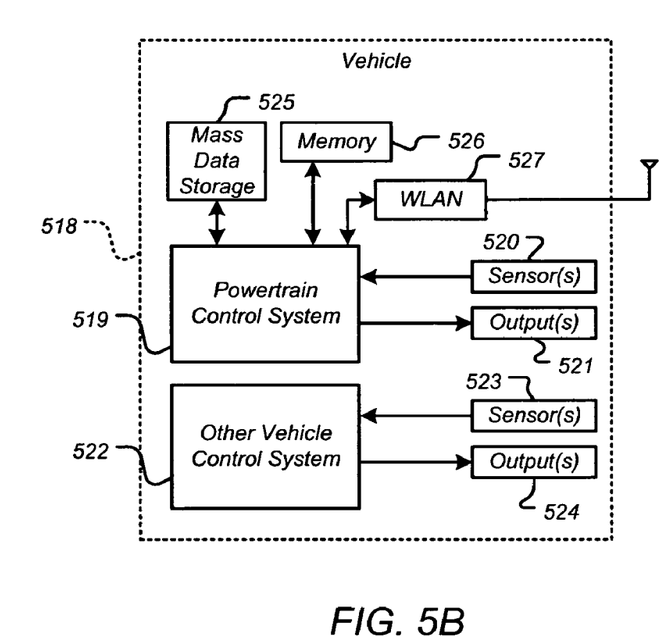

Referring now to FIG. 5B, the present invention implements a control system of a vehicle 518, a WLAN interface and/or mass data storage of the vehicle control system. In some implementations, the present invention implements a powertrain control system 519 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 522 of the vehicle 518. The control system 522 may likewise receive signals from input sensors 523 and/or output control signals to one or more output devices 524. In some implementations, the control system 522 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 519 may communicate with mass data storage 525 that stores data in a nonvolatile manner. The mass data storage 525 may include optical and/or magnetic storage devices for example hard disk drives HDD and/or DVDs. The HDD may be a mini HDD that includes one or more platters having a diameter that is smaller than approximately 1.8". The powertrain control system 519 may be connected to memory 526 such as RAM, ROM, low latency nonvolatile memory such as flash memory and/or other suitable electronic data storage. The powertrain control system 519 also may support connections with a WLAN via a WLAN network interface 527. The control system 522 may also include mass data storage, memory and/or a WLAN interface (all not shown).

Figure 5C:
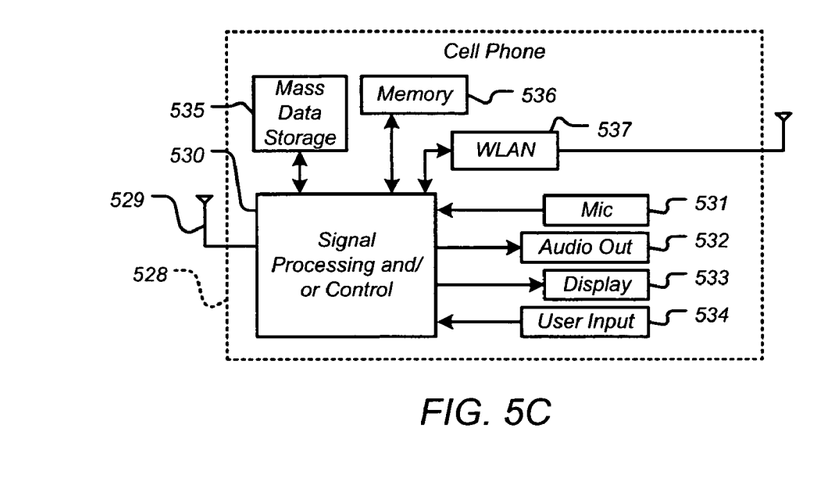

Referring now to FIG. 5C, the present invention can be implemented in a cellular phone 528 that may include a cellular antenna 529. The present invention may implement either or both signal processing and/or control circuits, which are generally identified in FIG. 5C at 530, a WLAN interface and/or mass data storage of the cellular phone 528. In some implementations, the cellular phone 528 includes a microphone 531, an audio output 532 such as a speaker and/or audio output jack, a display 533 and/or an input device 534 such as a keypad, pointing device, voice actuation and/or other input device. The signal processing and/or control circuits 530 and/or other circuits (not shown) in the cellular phone 528 may process data, perform coding and/or encryption, perform calculations, format data and/or perform other cellular phone functions.

The cellular phone 528 may communicate with mass data storage 535 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 528 may be connected to memory 536 such as RAM, ROM, low latency nonvolatile memory such as flash memory and/or other suitable electronic data storage. The cellular phone 528 also may support connections with a WLAN via a WLAN network interface 537.

Figure 5D:
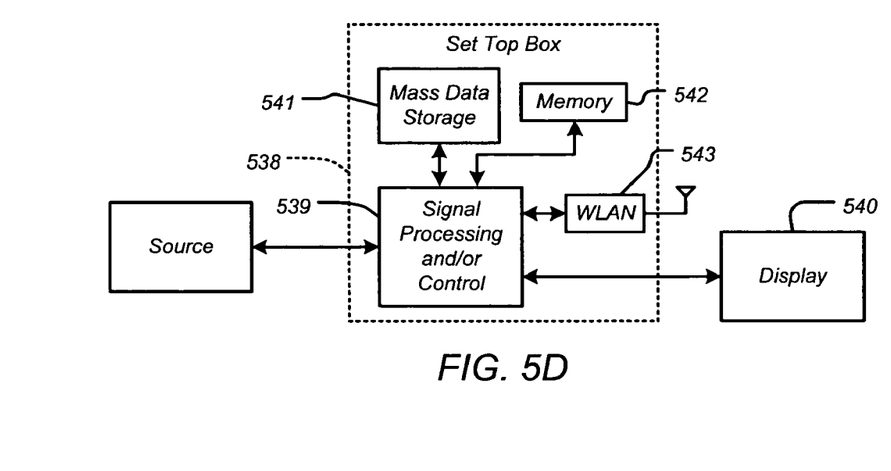

Referring now to FIG. 5D, the present invention can be implemented in a set top box 538. The present invention may implement either or both signal processing and/or control circuits, which are generally identified in FIG. 5D at 539, a WLAN interface and/or mass data storage of the set top box 538. The set top box 538 receives signals from a source such as a broadband source and outputs standard and/or high definition audio/video signals suitable for a display 540 such as a television and/or monitor and/or other video and/or audio output devices. The signal processing and/or control circuits 539 and/or other circuits (not shown) of the set top box 538 may process data, perform coding and/or encryption, perform calculations, format data and/or perform any other set top box function.

The set top box 538 may communicate with mass data storage 543 that stores data in a nonvolatile manner. The mass data storage 543 may include optical and/or magnetic storage devices for example hard disk drives HDD and/or DVDs. The HDD may be a mini HDD that includes one or more platters having a diameter that is smaller than approximately 1.8". The set top box 538 may be connected to memory 542 such as RAM, ROM, low latency nonvolatile memory such as flash memory and/or other suitable electronic data storage. The set top box 538 also may support connections with a WLAN via a WLAN network interface 543.

Figure 5E:
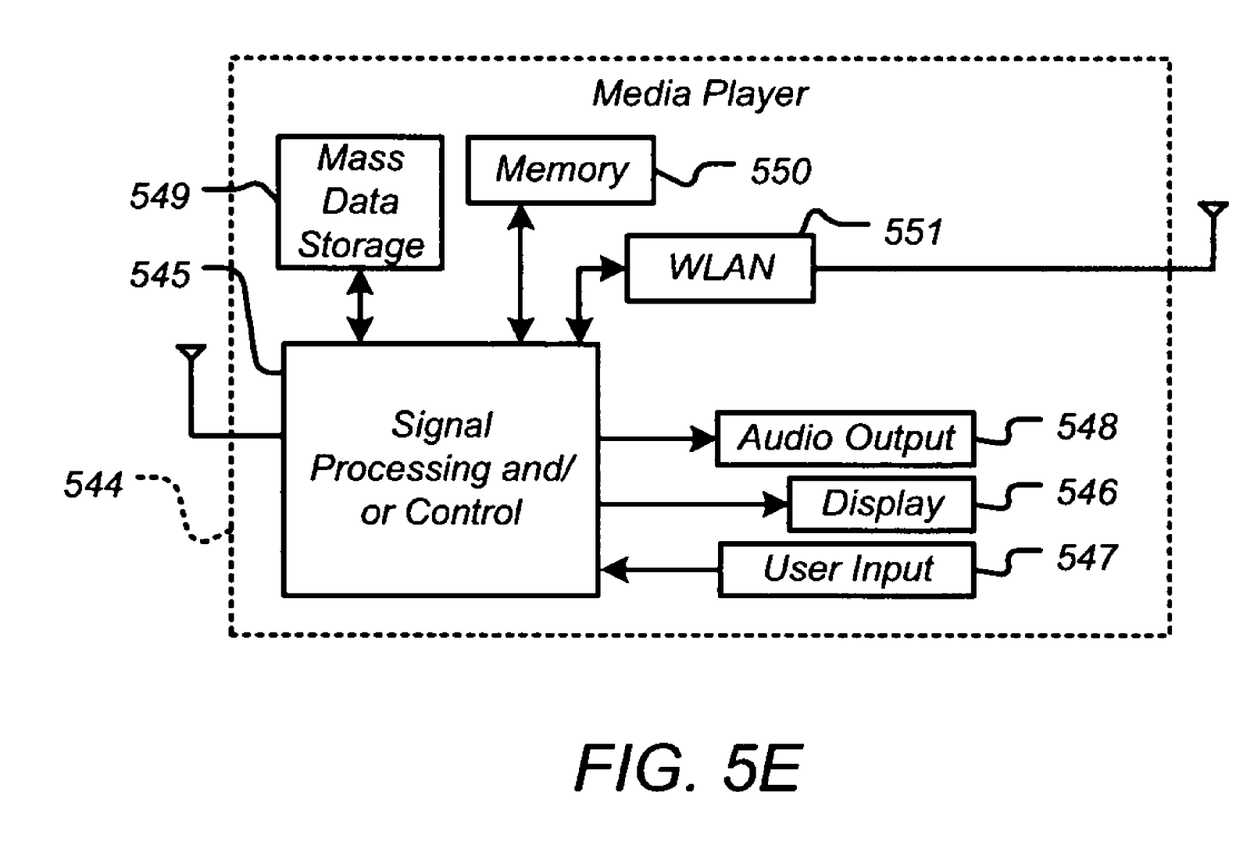

Referring now to FIG. 5E, the present invention can be implemented in a media player 544. The present invention may implement either or both signal processing and/or control circuits, which are generally identified in FIG. 5E at 545, a WLAN interface and/or mass data storage of the media player 544. In some implementations, the media player 544 includes a display 546 and/or a user input 547 such as a keypad, touchpad and the like. In some implementations, the media player 544 may employ a graphical user interface (GUI) that typically employs menus, drop down menus, icons and/or a point-and-click interface via the display 546 and/or user input 547. The media player 544 further includes an audio output 548 such as a speaker and/or audio output jack. The signal processing and/or control circuits 545 and/or other circuits (not shown) of the media player 544 may process data, perform coding and/or encryption, perform calculations, format data and/or perform any other media player function.

The media player 544 may communicate with mass data storage 549 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 544 may be connected to memory 550 such as RAM, ROM, low latency nonvolatile memory such as flash memory and/or other suitable electronic data storage. The media player 544 also may support connections with a WLAN via a WLAN network interface 551. Still other implementations in addition to those described above are contemplated.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An apparatus comprising:
   at least one input circuit to receive frames of data, the frames of data comprising
      first frames each having first data, and
      a second frame having second data;
   at least one output circuit to transmit the first frames;
   a forwarding engine to transfer the first frames from the at least one input circuit to the at least one output circuit; and
   a first memory to store switch information, wherein the apparatus operates according to the switch information,
   wherein the at least one input circuit comprises
      a remote management unit comprising
         a first memory controller to modify the switch information stored in the first memory according to the second data in the second frame, and
         a second memory;
      a second memory controller to write each of the frames of data to the second memory; and
      a remote management enable circuit to enable the remote management unit when the second frame is a remote management frame, and
   wherein the first memory controller writes the second data from the second memory to the first memory when (i) the remote management unit is enabled by the remote management enable circuit and (ii) the remote management frame includes a valid write command.

2. The apparatus of claim 1:
   wherein the second data describes associations between addresses of the first frames and the at least one output circuit; and
   wherein the forwarding engine transfers the first frames from the at least one input circuit to the at least one output circuit according to the associations.

3. The apparatus of claim 1:
   wherein the first memory controller reads third data from the first memory in response to the second frame;
   wherein the remote management unit further comprises a frame circuit to generate a third frame having the third data; and
   wherein the at least one output circuit transmits the third frame.

4. The apparatus of claim 3:
   wherein the first memory controller reads the third data from the first memory when (i) the remote management unit is enabled by the remote management enable circuit and (ii) the remote management frame includes a valid read command.

5. The apparatus of claim 3:
   wherein the third data comprises associations between addresses of the first frames and the at least one output circuit; and
   wherein the forwarding engine transfers the first frames from the at least one input circuit to the at least one output circuit according to the associations.

6. The apparatus of claim 3:
   wherein the third data comprises management information describing operation of the apparatus.

7. An integrated circuit comprising the apparatus of claim 1.

8. A switch comprising the integrated circuit of claim 7.

9. A method comprising:
   receiving frames of data into at least one input circuit of an apparatus, the frames of data comprising
      first frames each having first data, and
      a second frame having second data;
   transmitting the first frames from at least one output circuit;
   transferring the first frames from the at least one input circuit to the at least one output circuit;
   storing switch information in a first memory, wherein the apparatus operates according to the switch information;
   writing each of the frames of data to a second memory;
   enabling writing of the second data to a second memory when the second frame is a remote management frame;
   writing the second data from the second memory to the first memory when enabled and when the remote management frame includes a valid write command; and
   modifying the stored switch information according to the second data in the second frame.

10. The method of claim 9:
    wherein the second data describes associations between addresses of the first frames and the at least one output circuit, the method further comprising:
    transferring the first frames from the at least one input circuit to the at least one output circuit according to the associations.

11. The method of claim 9, further comprising:
    reading third data from the stored switch information in response to the second frame;
    generating a third frame having the third data; and
    transmitting the third frame from the at least one output circuit.

12. The method of claim 11:
    wherein the third data comprises associations between addresses of the first frames and the at least one output circuit, the method further comprising:
    transferring the first frames from the at least one input circuit to the at least one output circuit according to the associations.

13. The method of claim 11:
wherein the third data comprises management information describing operation of the apparatus.

14. An apparatus comprising:
at least one input circuit to receive frames of data, the frames of data comprising
   first frames each having first data, and
   a second frame having second data;
at least one output circuit to transmit the first frames;
a forwarding engine to transfer the first frames from the at least one input circuit to the at least one output circuit; and
a first memory to store third data comprising at least one of
   switch information, wherein the apparatus operates according to the switch information, and
   management information describing operation of the apparatus,
wherein the at least one input circuit comprises
   a remote management unit comprising
      a first memory controller to read the third data from the first memory in response to the second frame,
      a frame circuit to generate a third frame having the third data, wherein the at least one output circuit transmits the third frame, and
      a second memory;
   a second memory controller to write each of the frames of data to the second memory; and
   a remote management enable circuit to enable the remote management unit when the second frame is a remote management frame, and
wherein the first memory controller reads the third data from the first memory when (i) the remote management unit is enabled by the remote management enable circuit and (ii) the remote management frame includes a valid read command.

15. The apparatus of claim 14:
wherein the third data comprises associations between addresses of the first frames and the at least one output circuit; and
wherein the forwarding engine transfers the first frames from the at least one input circuit to the at least one output circuit according to the associations.

16. The apparatus of claim 14:
wherein the first memory controller modifies the third data stored in the first memory according to the second data in the second frame.

17. The apparatus of claim 14:
wherein the first memory controller writes the second data from the second memory to the first memory when (i) the remote management unit is enabled by the remote management enable circuit and (ii) the remote management frame includes a valid write command.

18. The apparatus of claim 14:
wherein the second data describes associations between addresses of the first frames and the at least one output circuit; and
wherein the forwarding engine transfers the first frames from the at least one input circuit to the at least one output circuit according to the associations.

19. An integrated circuit comprising the apparatus of claim 14.

20. A switch comprising the integrated circuit of claim 19.

21. A method comprising:
receiving frames of data into at least one input circuit of an apparatus, the frames of data comprising
   first frames each having first data, and
   a second frame having second data;
transmitting the first frames from at least one output circuit;
transferring the first frames from the at least one input circuit to the at least one output circuit;
storing third data in a first memory, the third data comprising at least one of
   switch information, wherein the apparatus operates according to the switch information, and
   management information describing operation of the apparatus;
writing each of the frames of data to a second memory;
enabling reading of the third data when the second frame is a remote management frame;
reading the third data from the first memory when enabled and when the remote management frame includes a valid read command;
generating a third frame having the third data; and
transmitting the third frame from the at least one output circuit.

22. The method of claim 21:
wherein the third data comprises associations between addresses of the first frames and the at least one output circuit, the method further comprising:
transferring the first frames from the at least one input circuit to the at least one output circuit according to the associations.

23. The method of claim 21, further comprising:
modifying the third data according to the second data in the second frame.

24. The method of claim 21:
wherein the second data describes associations between addresses of the first frames and the at least one output circuit, the method further comprising:
transferring the first frames from the at least one input circuit to the at least one output circuit according to the associations.

* * * * *